United States Patent Office 2,904,598
Patented Sept. 15, 1959

2,904,598
4-FLUOROCYCLOHEXENE

David M. McQueen, North Hills, Del., assignor to E. I. du Pont de Nemours and Company, Wilmington, Del., a corporation of Delaware No Drawing. Application February 24, 1954
Serial No. 412,391

1 Claim. (Cl. 260—648)

This invention relates to the new organic compound 4-fluorocyclohexene and has as its primary object provision of the same.

Vinyl fluoride copolymerizes with butadiene in the presence of a polymerization catalyst to form macromolecular copolymers. It has now been found that vinyl fluoride can be reacted in the absence of a polymerization catalyst with butadiene at a temperature of 150–300° C. and autogenous pressure to form 4-fluorocyclohexene.

In a preferred method for preparing the new monofluoro-substituted cyclohexene of this invention a pressure reactor is charged with a mixture of vinyl fluoride and butadiene and the mixture heated in a closed reactor to between 150° and 300° C. After pressure has ceased to drop, the reactor is permitted to cool to room temperature, and the volatile materials are bled into a cold container. The liquid residue is then subjected to distillation under reduced pressure to isolate the desired monofluorocyclohexene from other reaction products.

The following examples are illustrative of the invention.

EXAMPLE I

In a Dry-Ice cooled and evacuated 400-cc. stainless steel shaker tube were placed 67 g. (1.46 moles) of vinyl fluoride and 133 g. (2.46 moles) of butadiene (ratio 0.59/1). The mixture was heated 8 hours at 200° C., during which time the pressure dropped from a maximum of 195 atmospheres to 90 atmospheres. The shaker tube was cooled to room temperature and the volatile contents, amounting to 62 g., were bled into another cold shaker tube. The liquid residue of 107 g. was distilled through a 30" spinning band column, collecting the following fractions:

| Fraction | B.P., ° C. | Vol. cc. | $n_D^{25}$ |
|---|---|---|---|
| 1 | 30–99.5 | 0.5 | |
| 2 | 99.5–99.7 | 4.0 | 1.4310 (4-fluorocyclohexene). |
| 3 | 99.7–126 | 8.0 | 1.4530. |
| 4 | 126–127 | 13.0 | 1.4608 (butadiene dimer). |
| 5 | 127 | 8.5 | 1.4611 (butadiene dimer). |

The residue of 75 g. was mostly 4-vinylcyclohexene (butadiene dimer).

EXAMPLE II

Example I was repeated using a 2:1 mole ratio of vinyl fluoride to butadiene. Under these conditions the yield of material boiling in the range 99.5° to 108° C. was raised to 6.5 grams.

Fractions from Examples I and II containing 4-fluorocyclohexene were combined and distilled through a 1-foot spinning band column. A center cut boiling at 102° to 102.5° C., $n_D^{25}$ 1.4305 was isolated and analyzed.

*Analysis*

Calculated for $C_6H_9F$: F, 18.98%.
Found: F, 18.8%, 18.9%.

Infrared spectra analysis indicated the structure to be 4-fluorocyclohexene.

4-fluorocyclohexene is readily oxidized with nitric acid in the presence of catalytic amounts of vanadium pentoxide to 3-fluoroadipic acid, a nylon and polyester intermediate, as shown below: A mixture of 0.10 g. of vanadium pentoxide, $V_2O_5$, and 10 cc. of concentrated nitric acid was heated to reflux under a water-cooled condenser. Through the top of the condenser there was added 2.0 cc. (ca. 1.8 g.) of 4-fluorocyclohexene, prepared as in Examples I and II. Vigorous evolution of $N_2O_4$ occurred. After one hour heating at reflux, most of the $N_2O_4$ had been eliminated. The mixture was then cooled in ice, the crystals which separated were removed by filtration, and washed twice with water. The crystalline product was flesh colored and melted at 151°–153° C. After recrystallization from water there was obtained 0.6 g. of a white crystalline material which melded at 153.5° to 154.5° C. and which analyzed 12.18%, 12.29% F. Theory for fluoroadipic acid ($C_6H_9O_4F$) is 11.6% F.

The embodiments of the invention in which an exclusive property or privilege is claimed are defined as follows:

4-fluorocyclohexene.

References Cited in the file of this patent

UNITED STATES PATENTS

| | | |
|---|---|---|
| 2,336,208 | Alder et al. | Dec. 7, 1943 |
| 2,349,232 | Joshel | May 16, 1944 |
| 2,462,345 | Barrick | Feb. 22, 1949 |